(12) United States Patent
Saraswathi et al.

(10) Patent No.: US 8,715,384 B2
(45) Date of Patent: May 6, 2014

(54) INLET AIR PULSE FILTRATION SYSTEM

(75) Inventors: Rajesh Prabhakaran Saraswathi, Bangalore Karnataka (IN); Rahul Chillar, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 390 days.

(21) Appl. No.: 13/166,922

(22) Filed: Jun. 23, 2011

(65) Prior Publication Data

US 2012/0324843 A1 Dec. 27, 2012

(51) Int. Cl.
*B01D 46/00* (2006.01)

(52) U.S. Cl.
USPC ............... 55/498; 55/484; 55/521; 55/529

(58) Field of Classification Search
USPC .............. 55/482, 484, 498, 521, 529
See application file for complete search history.

(56) References Cited

U.S. PATENT DOCUMENTS

| | | | |
|---|---|---|---|
| 6,875,256 B2 | 4/2005 | Gillingham et al. | |
| 6,916,353 B2 * | 7/2005 | Tang ............................. | 55/495 |
| 7,008,465 B2 | 3/2006 | Graham et al. | |
| 7,125,433 B2 | 10/2006 | Garikipati et al. | |
| 7,311,747 B2 | 12/2007 | Adamek et al. | |
| 7,338,544 B2 | 3/2008 | Sporre et al. | |
| 7,488,365 B2 | 2/2009 | Golden et al. | |
| 7,520,913 B2 | 4/2009 | Mills et al. | |
| 7,641,708 B2 | 1/2010 | Kosmider et al. | |
| 7,648,564 B2 | 1/2010 | Chillar et al. | |
| 8,282,700 B2 * | 10/2012 | Walz et al. ....................... | 55/503 |
| 8,349,043 B2 * | 1/2013 | Jarrier .............................. | 95/268 |
| 8,349,045 B2 * | 1/2013 | Jarrier ........................... | 55/385.1 |
| 8,506,667 B2 * | 8/2013 | Nikolin et al. .................. | 55/498 |
| 2004/0103626 A1 * | 6/2004 | Warth et al. ..................... | 55/467 |
| 2007/0209343 A1 | 9/2007 | Cuvelier | |
| 2008/0272048 A1 | 11/2008 | Mei et al. | |
| 2008/0298957 A1 | 12/2008 | Chillar et al. | |
| 2010/0024370 A1 * | 2/2010 | Jones et al. ..................... | 55/498 |
| 2010/0037777 A1 | 2/2010 | Davis et al. | |
| 2010/0054919 A1 | 3/2010 | Hiner et al. | |
| 2010/0154631 A1 | 6/2010 | Chillar et al. | |
| 2011/0042836 A1 | 2/2011 | Zhang et al. | |
| 2011/0048228 A1 * | 3/2011 | Handley et al. .................. | 95/45 |
| 2013/0008313 A1 * | 1/2013 | Handley et al. .................. | 96/11 |

FOREIGN PATENT DOCUMENTS

| | | |
|---|---|---|
| DE | 4211752 A1 | 10/1993 |
| DE | 102004021180 A1 | 11/2005 |
| EP | 1882510 A1 | 1/2008 |
| GB | 2454306 A | 5/2009 |
| WO | 2009152439 A1 | 12/2009 |

OTHER PUBLICATIONS

Search Report and Written Opinion from EP Application No. 12172556.8 dated Sep. 19, 2012.
U.S. Appl. No. 13/025,219, filed Feb. 11, 2011, Jarrier, Application not yet published.
U.S. Appl. No. 13/025,227, filed Feb. 11, 2011, Jarrier, Application not yet published.

* cited by examiner

*Primary Examiner* — Robert Clemente
(74) *Attorney, Agent, or Firm* — Sutherland Asbill & Brennan LLP

(57) ABSTRACT

The present application provides an inlet air pulse filtration system. The inlet air pulse filtration system may include an inlet filter house and a number of pulse filters positioned therein. One or more of the pulse filters may include a conical section, a transitional section, and a tapered section.

16 Claims, 2 Drawing Sheets

INLET AIR PULSE FILTRATION SYSTEM

TECHNICAL FIELD

The present application and the resultant patent relate generally to turbo-machinery such as gas turbine engines and the like and more particularly relate to an improved inlet air pulse filtration system with pulse filters having a tapered section for increased filtration efficiency, a reduced pressure drop, and improved dust holding capacity.

BACKGROUND OF THE INVENTION

Power generation equipment, such as a gas turbine engine, uses a large supply of intake air to support the combustion process. Various types of inlet air filtration systems thus may be used upstream of the compressor. Impure air laden with dust particles, salt, and other contaminants may damage the compressor blades and other types of power plant equipment via corrosion, erosion, and the like. Such damage may reduce the life expectancy and performance of the compressor and other types of equipment. To avoid these problems, the inlet air generally passes through a series of filters and screens to assist in removing the contaminants before they reach the compressor.

One type of inlet air filtration system includes the use of pulse filtration. A pulse filtration system generally includes a number of pulse filters. The pulse filters may have a conical section and a cylindrical section mounted together via a yoke assembly. The conical and cylindrical sections may be joined via a gasket and the like. The pulse filtration system may be self cleaning via a brief reverse pulse of pressurized air through the filters to dislodge dust particles therein.

The air entering into the pulse filters may come from the ambient through a weather hood. The ambient air entering the weather hood may take a number of turns to reach and pass through the pulse filters. A recirculation zone therefore may be produced about the entrance to the pulse filters. Such a recirculation zone may cause the incoming airflow to stagnate and increase the pressure losses across the filters. Overall system efficiency and power output may be a direct function of the inlet pressure drop caused herein.

There is thus a desire for an inlet air pulse filtration system with pulse filters having a reduced pressure drop thereacross. Such an improved inlet air filtration system would provide adequate and/or improved filtration with less of a pressure drop so as to improve overall system out put and efficiency.

SUMMARY OF THE INVENTION

The present application and the resultant patent thus provide an inlet air pulse filtration system. The inlet air pulse filtration system may include an inlet filter house and a number of pulse filters positioned therein. One or more of the pulse filters may include a conical section, a transitional section, and a tapered section.

The present application and the resultant patent further provide a pulse filter for use with an inlet filter system and a compressor. The pulse filter may include a conical section, a transitional section adjacent to the conical section, and a tapered section adjacent to the cylindrical section.

The present application and the resultant patent further provide an inlet air pulse filtration system. The inlet air pulse filtration system may include an inlet filter house and a number of pulse filters positioned therein. One or more of the pulse filters may include a conical section, a transitional section, a tapered section, and a pleated filter media. The tapered section may include an angle off of the horizontal of about negative five degrees (−5°) to about thirty degrees (30°).

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
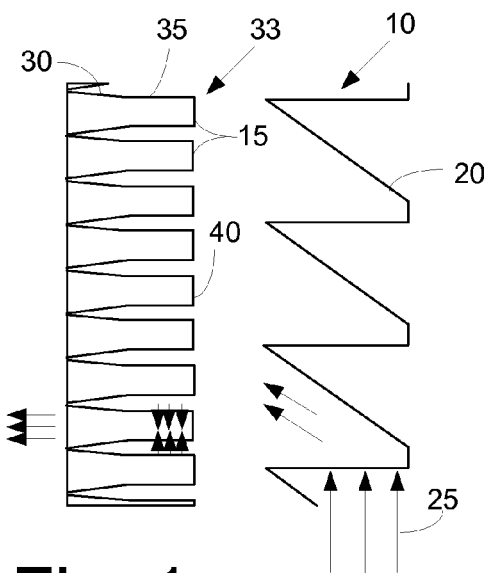
FIG. 1 is a schematic view of an inlet filter house with known pulse filters therein.

Referring now to the drawings, in which like numerals refer to like elements throughout the several view, FIG. 1 shows a portion of a known inlet filter house 10. As was described above, the inlet filter house 10 includes a number of pulse filters positioned about a weather hood 20. An incoming airflow path 25 therethrough also is shown. Each pulse filter 15 generally includes a conical section 30 and a cylindrical section 35. The forward cylindrical section 33 generally ends at about a large flat or a blunt face 40.

As is shown, the airflow path 25 takes a turn to reach the pulse filters 15 when entering the weather hood 20 and then multiple turns to pass through the pulse filters 15. The multiple turns and the blunt face 40 thus may combine to form one or more recirculation zones about the blunt face 40. The recirculation zones stagnates the airflow so as to increase the pressure drop across the pulse filters 15 The effectiveness of the filtration also may be reduced by the nonuniformmity in the airflow entering the pulse filters 15.

Figure 2:
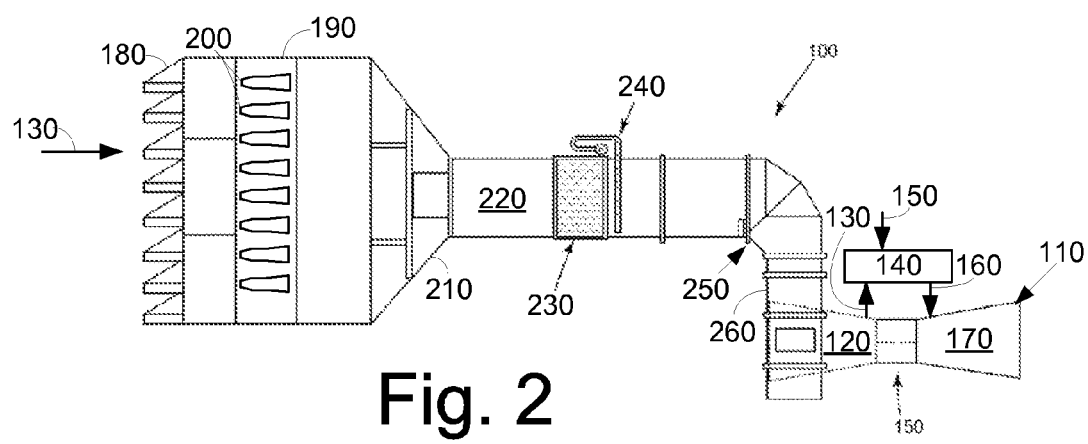
FIG. 2 is a schematic view of an inlet air pulse filtration system as may be described herein.

FIG. 2 shows an example of an inlet air pulse filtration system 100 as may be described herein. The inlet air pulse filtration system 100 may be used with a gas turbine engine 110. As is known, the gas turbine engine 110 may include a compressor 120. The compressor 120 compresses an incoming flow of air 130. The compressor 120 delivers the compressed flow of air 130 to a combustor 140. The combustor 140 mixes the compressed flow of air 130 with a compressed flow of fuel 150 and ignites the mixture to create a flow of combustion gasses 160. The flow of combustion gases 160 is in turn delivered to a turbine 170. The flow of combustion gases 160 drives the turbine 170 so as to produce mechanical work. The gas turbine engine 110 may use natural gas, various types of syngas, and/or other types of fuels. The gas turbine engine 110 may be any one of a number of different gas turbine engines offered by General Electric Company of Schenectady, N.Y. and the like. Other components and configurations may be used herein.

The inlet air pulse filtration system 100 also may include a weather hood 180 mounted on an inlet filter house 190 for the incoming flow of air 130 to pass therethrough. The weather hood 180 may prevent weather elements such as rain, snow, and the like from entering therein. The weather hood 180 and the inlet filter house 190 may be largely of conventional design. The inlet filter house 190 may have a number of pulse filters 200 mounted therein as will be described in more detail below. The pulse filters 200 remove dust and other types of contaminants and impurities from the incoming flow of air 130. Any number of the pulse filters 200 may be used herein in any orientation.

The flow of air 130 then may flow through a transition piece 210 and an inlet duct 220. A silencer section 230 and an inlet bleed heat system 240 also may be used therein. One or more screens 250 may be used to deflect larger types of contaminates or debris. The flow of air 130 then may pass through an inlet plenum 260 and into the compressor 120 for compression and combustion as described above. Other configurations and other components may be used herein. Many different types of operating parameters may be accommodated herein.

Figure 3:
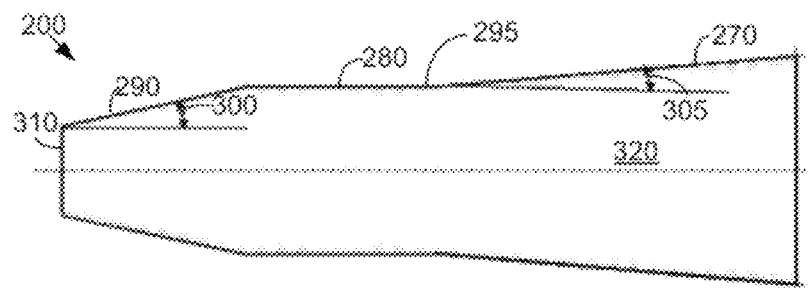
FIG. 3 is a side plan view of a pulse filter as may be used with the inlet air pulse filtration system of FIG. 2.

FIG. 3 shows and example of the pulse filter 200 as may be described herein. Instead of the pulse filter 15 described above with only the conical section 30 and the cylindrical section 35, the pulse filter 200 includes a conical section 270 leading to a transitional section 280 as well as a tapered section 290. In this example, the transitional section 280 may take the form of a circular section 295. Although the respective conical sections 270, 30 may be similar in length and angle, the cylindrical section 295 and the tapered section 290 of the pulse filter 200 may have about the same length as the cylindrical section 35 alone of the pulse filter 15. The cylindrical section 295 of the pulse filter 200 may be slightly longer in length than the tapered section 290. Other lengths may be used herein.

The tapered section 290 may have a tapered angle 300 off of the horizontal of about negative five degrees (−5°) to about thirty degrees (30°) or so. Other angles may be used herein. The tapered angle 300 may vary in specific application and operating parameters. The tapered angle 300 may be greater than an angle 305 off of the horizontal of the conical section 270. The tapered section 290 may lead to a blunt face 310. The blunt face 310 of the pulse filter 200 may be smaller in diameter than the blunt face 40 of the pulse filter 15. The pulse filter 200 may be a retrofit for the pulse filter 15 or the pulse filter 200 may be original equipment. Other components and other configurations may be used herein.

The pulse filter 200 may include a pleated filter media 320. The pleated filter media 320 may be made of any suitable material including glass or polytetraflouroethylene (PTFE) fibers and the like. Suitable membranes also may be used herein. Other types of materials may be used herein. A conventional air blast system with associated air piping also may be used herein so as to clean the pulse filters 200.

The use of the tapered section 290 thus provides the pulse filter 200 and the inlet air pulse filtration system 100 as a whole with enhanced filtration efficiency and effectiveness as well as reduced pressure losses thereacross. Specifically, the use of the tapered section 290 and the overall geometry of the pulse filters 200 described herein reduce the recirculation or stagnation zones about the entry to the pulse filter 200 as was found in previous designs. Instead, the incoming flow of air 130 entering into the pulse filters 200 described herein may interact easily with the tapered section 290 without requiring multiple turns. The pulse filters 200 described herein also have improved dust holding capacity given the lack of flow irregularities. The overall pressure drop across the pulse filters 200 thus may be reduced about twenty percent (20%) or more. Such a reduced pressure drop further provides overall increased power plant efficiency and output.

Figure 4:
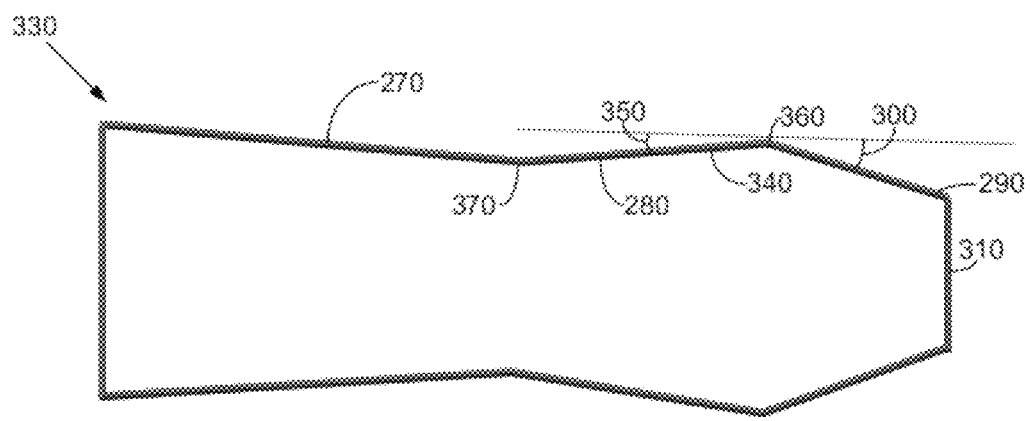
FIG. 4 is a side plan view of an alternative embodiment of a pulse filter as may be described herein.

FIG. 4 shows a further embodiment of a pulse filter 330 as may be described herein. As above, the pulse filter 330 may include the conical section 270, the transitional section 280, and the tapered section 290. In this example, the transitional section 280 may be in the form of a reverse taper section 340.

As the name implies, the reverse taper section 340 includes a taper in the opposite direction to that of the tapered section 290. The reverse taper section 340 may have an angle 350 off of the horizontal that is less in magnitude than the angle 300 of the tapered section 290. The angle 350 may vary. Likewise, the length of the various sections may vary. The reverse taper section 340 and the tapered section 290 may meet at an apex 360. Likewise, the conical section 270 and the reverse taper section 340 may meet at a nadir 370. Other components and other configurations may be used herein.

The use of the reverse taper section 340 thus provides the pulse filter 330 with further effectiveness and reduced overall pressure losses. Specifically, the reverse taper section 340 assist in providing a Venturi effect to the incoming flow of air 130 for improved flow therethrough.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. An inlet air pulse filtration system, comprising:
   an inlet filter house;
   a plurality of pulse filters positioned therein; and
   one or more of the plurality of pulse filters comprising a conical section, a transitional section, and a tapered section, wherein the transitional section comprises a cylindrical section or a reverse taper section.

2. The inlet air pulse filtration system of claim 1, wherein the tapered section comprises an angle off of the horizontal of about negative five degrees)(−5°)to about thirty degrees (30°).

3. The inlet air pulse filtration system of claim 1, wherein the tapered section comprises a first angle and the conical section comprises a second angle and wherein the first angle is greater than the second angle.

4. The inlet air pulse filtration system of claim 1, wherein the tapered section leads to a blunt face.

5. The inlet air pulse filtration system of claim 1, wherein the plurality of pulse filters comprises a pleated filter media.

6. The inlet air pulse filtration system of claim 5, wherein the pleated filter media comprises glass or polytetraflouroethylene (PTFE) fibers.

7. The inlet air pulse filtration system of claim 1, wherein the transitional section comprises a first length and the tapered section comprises a second length and wherein the first length is equal to or greater than the second length.

8. The inlet air pulse filtration system of claim 1, wherein the inlet filter house comprises a weather hood thereon.

9. The inlet air pulse filtration system of claim 1, further comprising a gas turbine engine downstream of the inlet filter house.

10. The inlet air pulse filtration system of claim 7, wherein the gas turbine engine comprises a compressor.

11. The inlet air pulse filtration system of claim 1, further comprising one or more screens downstream of the inlet filter housing.

12. A pulse filter for use with an inlet filter system and a compressor, comprising:
   a conical section;
   a transitional section adjacent to the conical section; and
   a tapered section adjacent to the transitional section, wherein the transitional section comprises a reverse taper section.

13. The pulse filter of claim 12, wherein the tapered section comprises an angle off of the horizontal of about negative five degrees (−5°) to about thirty degrees (30°).

14. The pulse filter of claim 12, wherein the tapered section comprises a first angle and the conical section comprises a second angle and wherein the first angle is greater than the second angle.

15. The pulse filter of claim 12, wherein the tapered section leads to a blunt face.

16. An inlet air pulse filtration system, comprising:
an inlet filter house; and
a plurality of pulse filters positioned therein;
one or more of the plurality of pulse filters comprising a conical section, a transitional section, and a tapered section, wherein the tapered section comprises a first angle and the conical section comprises a second angle and wherein the first angle is greater than the second angle.

* * * * *